Figure 1:
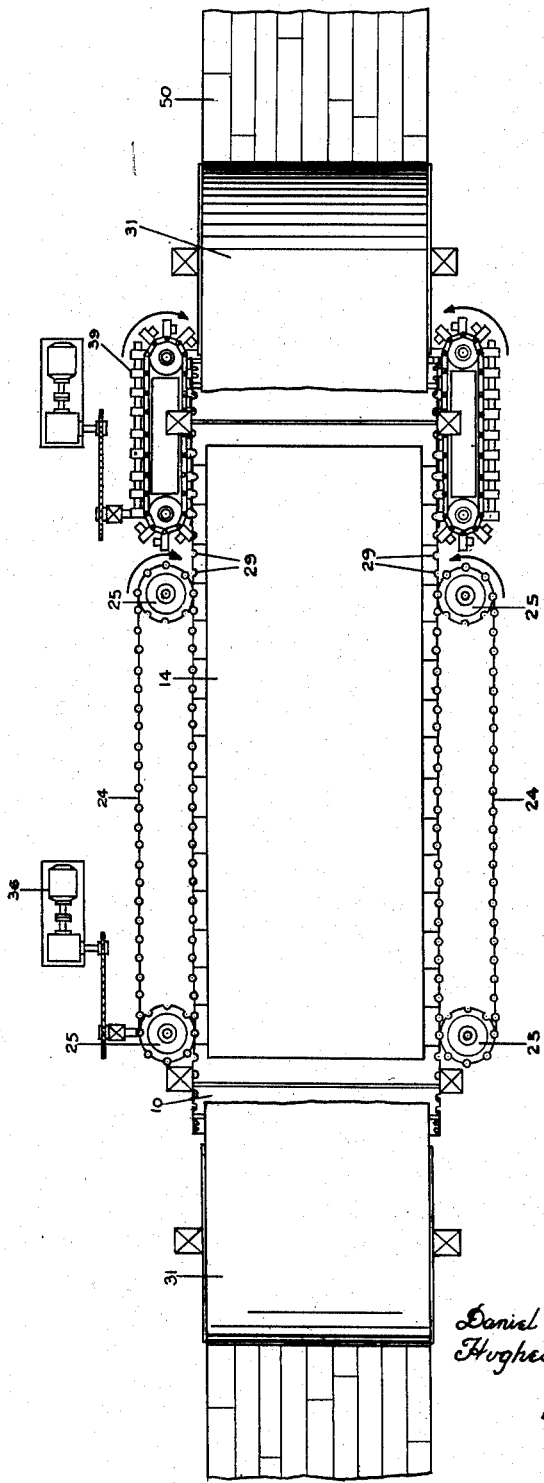

Feb. 3, 1953  D. W. SMITH ET AL  2,627,291
PRESS FOR LAMINATED LUMBER
Filed May 9, 1951  4 Sheets-Sheet 1

Daniel W. Smith and
Hughes Hall   INVENTORS.

BY Bentley C. Morrow
Attorney

Feb. 3, 1953  D. W. SMITH ET AL  2,627,291
PRESS FOR LAMINATED LUMBER
Filed May 9, 1951  4 Sheets-Sheet 2

Daniel W. Smith and
Hughes Hall  INVENTORS.
BY Bentley O. Morrow
Attorney

Feb. 3, 1953 D. W. SMITH ET AL 2,627,291
PRESS FOR LAMINATED LUMBER
Filed May 9, 1951 4 Sheets-Sheet 4

Daniel W. Smith and
Hughes Hall   INVENTORS.
BY Bentley Q. Morrow
Attorney

Patented Feb. 3, 1953

2,627,291

UNITED STATES PATENT OFFICE 2,627,291

PRESS FOR LAMINATED LUMBER

Daniel W. Smith, Hendersonville, N. C., and Hughes Hall, Knoxville, Tenn., assignors to the Tennessee Valley Authority, a corporation of the United States Application May 9, 1951, Serial No. 225,438

2 Claims. (Cl. 144—281)

(Granted under Title 35, U. S. Code (1952), sec. 266)

The invention herein described may be manufactured and used by or for the Government for governmental purposes without the payment to us of any royalty therefor.

This invention relates to improvements in apparatus for the production of laminated lumber from slats having thickness substantially greater than that of veneers ordinarily used in the manufacture of plywood.

A process and apparatus for the production of laminated lumber from thick slats of random lengths has been described in U. S. Patent 2,490,819. The apparatus described therein comprises means for separately advancing three continuous layers of slats into superimposed contact, means for applying cement between the layers of slats, means for preheating the layers of slats, and a heated continuous press section.

The press section described has, however, proved to be rather difficult to operate. The principal difficulty results from the tendency of moving press components, which are in direct contact with a strip of laminated lumber being formed, to shift to one side during passage through the press. This tendency has its cause in minor variations in the press components due to wear, inaccuracies in manufacture, and to variations in the slats themselves; and results in an operator having to devote much time to controlling the direction in which the press moves. A press section for the apparatus described in the above-mentioned patent which would eliminate the necessity for steering press components and lumber being formed and which would eliminate difficulties due to shifting too far to one side would be a great improvement in the apparatus.

It is an object of this invention to provide an improved pressure apparatus for making laminated lumber in which the necessity for steering the lumber being formed is eliminated.

Another object is to provide an improvement in the apparatus of U. S. Patent 2,490,819, which eliminates difficulties due to shifting too far to one side under pressure.

Another object is to provide such apparatus having the particular advantageous arrangement of parts shown and described.

Other objects and advantages will become apparent as this disclosure proceeds.

We have found that these objects are attained in a press section which comprises the combination of two endless chains of platens, at least one chain comprising pairs of platens spaced from each other in superimposed relationship, and at least one elastic compressible member disposed between the platens of each pair to be carried by one platen and to support the other resiliently; a plurality of rotatably mounted sprockets disposed to support the chains with a run of each in position to cooperate to form jaws of a press; means, disposed adjacent to the entrance of said press, for forcing said jaws toward each other and compressing said elastic members; retaining members disposed to engage and retain said jaws in such forced relationship; means, disposed adjacent to the outlet of said press, for releasing said retaining members; and means for driving said chains.

Figure 2:
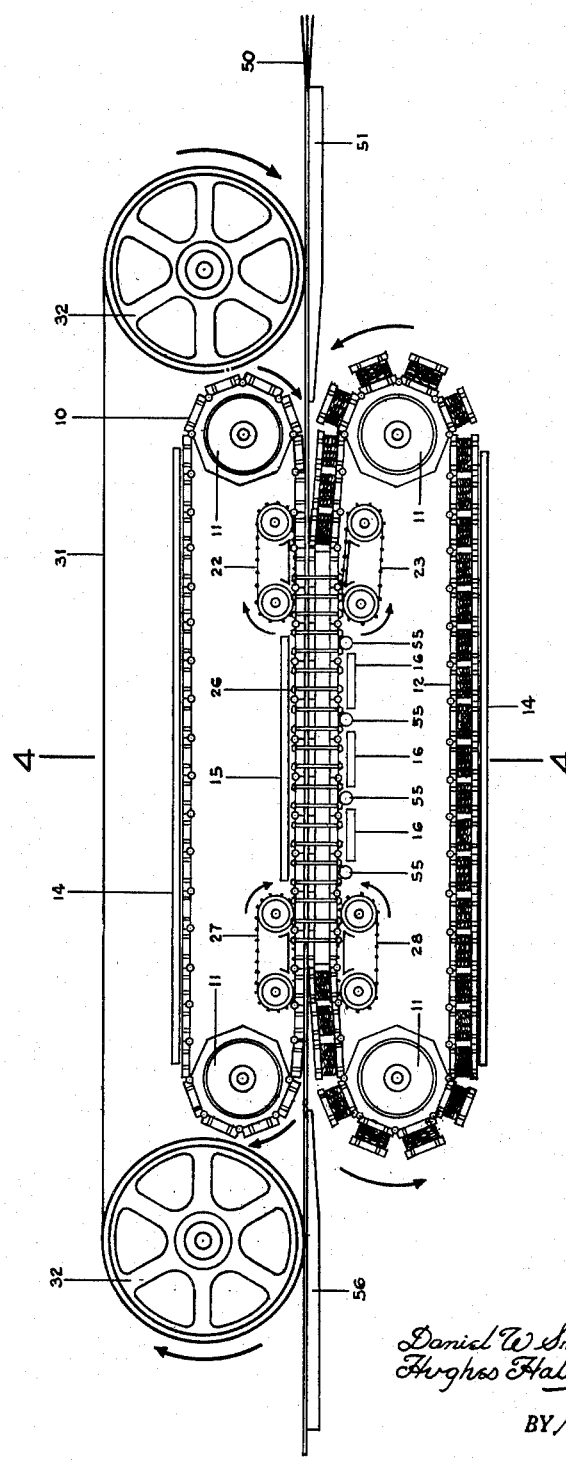
Figure 3:
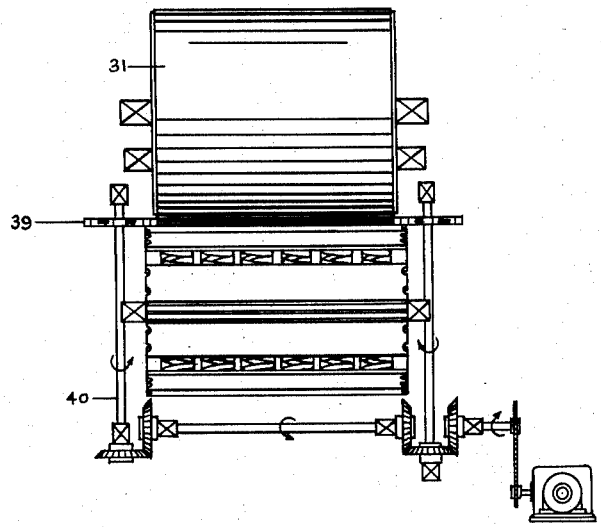
Figure 4:
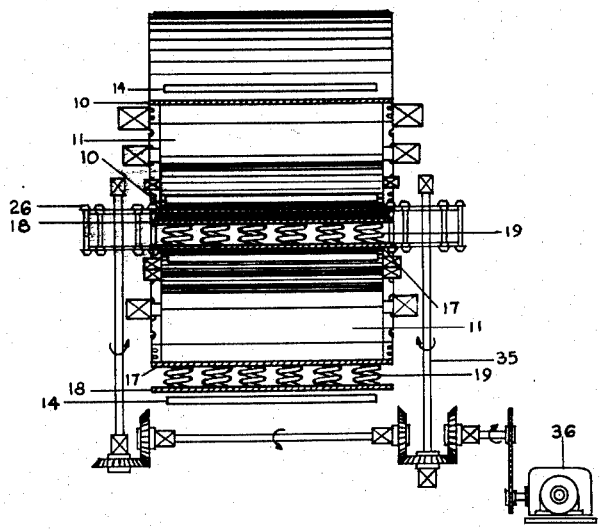
Figure 5:
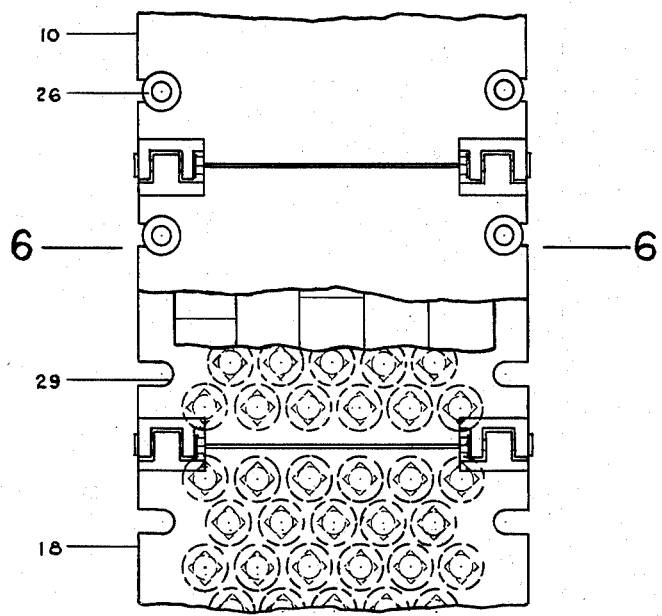
Figure 6:
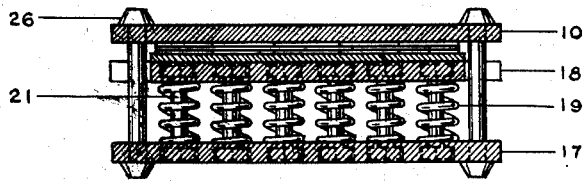

In the attached drawings Figure 1 is a plan view of one particular machine embodying our invention; Figure 2 is a side elevation of the same machine, omitting some auxiliary equipment shown in Figure 1; Figure 3 is an elevation of the entrance of a press section described; Figure 4 is a section on the line 4—4 of Figure 2; Figure 5 is an enlarged plan of press jaws partly broken away; and Figure 6 is a section on the line 6—6 of Figure 5. Like reference numerals designate like parts in all figures.

With reference to Figures 1 and 2, the numeral 10 designates an upper endless chain of platens disposed upon rotatably mounted sprockets 11. A lower endless chain of platens 12 is also disposed upon similar rotatably mounted sprockets 11. Sprockets 11 are disposed to movably support chains 10 and 12 with a run of each in position to cooperate to form the jaws of a press.

Heaters 14 are disposed adjacent to non-cooperating runs of chains 10 and 12 and serve to heat the platens of these chains. Additional heaters 15 and 16 are disposed adjacent to the cooperating runs of chains 10 and 12 and serve to supply additional heat to the press jaws and to the material being processed. These heaters may be of any type desired, but electrical-resistance heaters or gas-fired heaters are preferred because of their greater convenience and cleanliness in operation.

The platens of chain 12 are arranged in pairs, in superimposed relationship, as is shown most clearly in Figure 6. Each pair consists of a base platen 17 and a second platen 18 superimposed on and spaced from platen 17. At least one, and if the platens are not to be quite narrow, a plurality of elastic compressible members 19 are disposed between platens 17 and 18. These are carried by platen 17 and support and may exert pressure on platen 18. When the members 19 are coil springs, as illustrated, we have found it convenient to insert retaining pins 21 therein. These pins are preferably headed and may also serve to attach platen 18 to platen 17. Pins 21 fit slidably into sockets in one or both platens and must not prevent substantial movement of platen 18 toward platen 17 in response to sufficient pressure.

Adjacent to the entrance of the press jaws there is a means for forcing chains 10 and 12 toward each other to compress the elastic members. This means may preferably be a short continuous auxiliary press comprising an upper belt of rollers 22 and a lower belt of rollers 23. Endless chains of retaining members 26 are disposed at each side of chains 10 and 12 upon rotatable sprockets 25 shown in Figure 1. These retaining members may be double-headed bolts designated by the numeral 26 in Figures 5 and 6, or may have other suitable shape.

A means for releasing retaining members is disposed adjacent to the outlet of the press proper. This means may also comprise a short continuous auxiliary press comprising an upper belt of rollers 27 and a lower belt of rollers 28. Sprockets 25 are disposed adjacent to belts 22 and 23 to guide retaining members 26 into engagement with slots 29 in individual platens of chains 10 and 12 while chains are under pressure from belts 23 and 24, and adjacent to belts 27 and 28 to withdraw the retaining members from the slots while chains 10 and 12 are under pressure from the latter belts.

A suitable train of gearing and shafting 35, shown in Figure 4 only, is disposed to cooperate with a motor 36, with at least two of sprockets 25, and with chains of retaining members 26 to drive the press. A short lateral press comprising endless chains of pressure members 39 is disposed just ahead of roller belts 22 and 23. This press 39 is driven through a suitable train 40 of gearing and shafting from a motor 41 shown in Figure 3 only.

A thin belt of flexible metal 31 is supported upon suitable pulleys 32 so that it has a run in contact with the run of platen chain 10 forming a jaw of the press proper. This belt functions to prevent marring of the surface of finished lumber by the interstices of platen chain 10.

In operation several continuous plies of thick slats 50, previously assembled, cemented, and preheated in auxiliary apparatus (not shown) are fed onto a suitable support 51. Here the upper ply comes in contact with belt 31 and enters a zone of lateral pressure from lateral press 39. While under lateral pressure the plies enter a zone of increasing vertical pressure from the roller belts 22 and 23, which also compress springs 19 supporting platens 18. At or near the point of maximum pressure from belts 22 and 23 the turning of sprockets 25 guides retaining members 26 into engagement with slots 29 in the individual platens of chains 10 and 12. Constant pressure from springs 19 is thus maintained so long as retaining members 26 are in the slots.

Tension on chains of retaining members 26, derived from motor 36, thus carries the assembly along. The section of the press between belts 22 and 27 may be made very long, thus giving plenty of time for cement to be set by heat. As the central section of the press is supported only by a few small wheels or rollers 55, it is free to deviate somewhat from a straight course. There is no relative movement between lumber being processed and the platens exerting pressure thereon. Because there is no extraneous pressure on a package comprising lumber held between corresponding platens of the two chains, the assembly is easily guided into the outlet end of the press and difficulties due to shifting to one side are eliminated.

When the assembly comes under additional pressure from belts 27 and 28, springs 19 are compressed further, thus loosening retaining members 26 on the platens. The second sprocket 25 then, in turning, withdraws members 26 from slots 29, and the resulting strip of finished lumber passes on across support 56 to further processing or use, as desired.

It is apparent that many changes may be made in the machine described without departing from the scope of our invention, which is limited only by the subtended claims. For instance, the press may be driven through sprockets 11 rather than through sprockets 25. The retaining members might be U-shaped rather than the double-headed bolts shown, or may even be hook-type members carried by one of the platen chains. Slots 29 may be eliminated when suitable retaining members and means for driving press are used. Many equivalents of coil springs 19 may be found, but the springs shown are preferred because of their cheapness and ready availability. Various types of short continuous auxiliary presses also may be substituted for the roller belts 22, 23 and 27, 28. Other changes of minor nature may suggest themselves to builders of apparatus.

We claim as our invention:

1. In a machine of the class described the combination of two endless chains of platens, at least one chain comprising pairs of platens in which one platen of each pair is spaced from the other in superimposed relationship; at least one elastic compressible member disposed between the platens of each pair to be carried by one platen and to support the other resiliently; a plurality of rotatably mounted sprockets disposed to support the chains movably, with a run of each chain in position to cooperate to form elongated jaws of a press having a central portion free to deviate from a straight course; a short continuous auxiliary press disposed adjacent to the entrance to said jaws to force said jaws toward each other and to compress said elastic members; a short continuous auxiliary press disposed adjacent to the outlet from said jaws to apply additional pressure upon said jaws and to compress said elastic members further; two pairs of rotatably mounted sprockets disposed in single pairs at each side of said jaws with their axes perpendicular to the axes of said first-mentioned sprockets and with a first sprocket of each pair adjacent to said first-mentioned auxiliary press and a second sprocket of each pair adjacent to said last-mentioned auxiliary press; two endless chains of retaining members singly disposed upon each of said pairs of sprockets in position to engage said jaws at said first-mentioned auxiliary press by rotation of the corresponding first sprocket and to be withdrawn from such engagement at said last-mentioned auxiliary press by rotation of the corresponding second sprocket; and means for driving said press by tension upon said chains of retaining members.

2. In a machine of the class described the combination of two endless chains of platens, at least one chain comprising pairs of platens in which one platen of each pair is spaced from the other in superimposed relationship; at least one elastic compressible member disposed between the platens of each pair to be carried by one platen and to support the other resiliently; a plurality of rotatably mounted sprockets disposed to support the chains movably, with a run of each chain in position to cooperate to form elongated jaws of a press having a central portion free to deviate from a straight course; an auxiliary lateral press disposed adjacent to the entrance to said jaws to feed material into the same under lateral pressure; means, disposed adjacent to the entrance of said jaws, for forcing said jaws toward each other and compressing said elastic members; retaining members movably disposed to engage and retain said jaws in such forced relationship without relative movement between said jaws and material being processed; means, disposed adjacent to the outlet from said press, for releasing said retaining members; and means for driving said press jaws by tension.

DANIEL W. SMITH.
HUGHES HALL.

REFERENCES CITED

The following references are of record in the file of this patent:

UNITED STATES PATENTS

| Number | Name | Date |
| --- | --- | --- |
| 709,864 | Boenning | Sept. 30, 1902 |
| 2,436,091 | Bolling | Feb. 17, 1948 |
| 2,490,819 | Lambert et al. | Dec. 13, 1949 |